United States Patent
Kamiya

(10) Patent No.: US 11,935,329 B2
(45) Date of Patent: Mar. 19, 2024

(54) VIDEO ANALYSIS PROGRAM

(71) Applicant: I'MBESIDEYOU INC., Minato-ku (JP)

(72) Inventor: Shozo Kamiya, Tokyo (JP)

(73) Assignee: I'MBESIDEYOU INC., Minato-Ku (JP)

( * ) Notice: Subject to any disclaimer, the term of this patent is extended or adjusted under 35 U.S.C. 154(b) by 0 days.

(21) Appl. No.: 18/552,384

(22) PCT Filed: Mar. 24, 2021

(86) PCT No.: PCT/JP2021/012360
§ 371 (c)(1),
(2) Date: Sep. 25, 2023

(87) PCT Pub. No.: WO2022/201383
PCT Pub. Date: Sep. 29, 2022

(65) Prior Publication Data
US 2024/0062586 A1     Feb. 22, 2024

(51) Int. Cl.
| | |
|---|---|
| *G06V 40/20* | (2022.01) |
| *G06V 20/40* | (2022.01) |
| *G06V 40/16* | (2022.01) |
| *G06V 40/18* | (2022.01) |

(52) U.S. Cl.
CPC ............. *G06V 40/20* (2022.01); *G06V 20/41* (2022.01); *G06V 20/44* (2022.01); *G06V 40/176* (2022.01); *G06V 40/18* (2022.01)

(58) Field of Classification Search
CPC ...... G06V 40/20; G06V 20/41; G06V 40/176; G06V 40/18; G06V 20/44

USPC ......................................................... 382/103
See application file for complete search history.

(56) References Cited

U.S. PATENT DOCUMENTS

2012/0290508 A1    11/2012   Bist

FOREIGN PATENT DOCUMENTS

| JP | 2000076421 A | 3/2000 |
|---|---|---|
| JP | 2011154665 A | 8/2011 |
| JP | 2011186521 A | 9/2011 |
| JP | 2012008949 A | 1/2012 |
| JP | 2013000300 A | 1/2013 |
| JP | 2015186127 A | 10/2015 |
| JP | 2016149063 A | 8/2016 |
| JP | 2017201499 A | 11/2017 |
| JP | 2018112831 A | 7/2018 |

(Continued)

OTHER PUBLICATIONS

International Search Report dated Jun. 1, 2021 for International Application No. PCT/JP2021/012360.

(Continued)

*Primary Examiner* — Mark Roz

(57) ABSTRACT

The system of the present disclosure comprises: an acquisition means for acquiring a video image of an online session between a first user and a second user; a face recognition means for recognizing at least a face image of the first user and the second user included in the video image for each predetermined frame; a voice recognition means for recognizing at least the voice of the subject included in the video image; an evaluation means for calculating an evaluation value from a plurality of viewpoints based on both the recognized face image and the voice; and a determination means for determining the degree of match of the second user to the first user based on the evaluation values.

4 Claims, 12 Drawing Sheets

(56) References Cited

FOREIGN PATENT DOCUMENTS

| | | |
|---|---|---|
| JP | 2019058625 A | 4/2019 |
| JP | 2019148852 A | 9/2019 |
| JP | 2020048610 A | 4/2020 |
| JP | 2020086559 A | 6/2020 |
| JP | 2021022909 A | 2/2021 |
| JP | 2021027917 A | 2/2021 |
| JP | 2021044001 A | 3/2021 |
| WO | 2015174426 A1 | 11/2015 |

OTHER PUBLICATIONS

Decision to Grant a Patent dated Aug. 25, 2022 for JP patent Application No. 2021572316.
Notice of Reasons for Refusal dated Jul. 14, 2022 for JP patent Application No. 2021572316.

VIDEO ANALYSIS PROGRAM

TECHNICAL FIELD

This invention relates to a video image analysis system that analyzes participant responses based on video images obtained by photographing participants during an online session in an environment where an online session is conducted with multiple participants, regardless of whether the participants are visible on the screen or not.

BACKGROUND ART

There is known technology for analyzing the emotions that others receive in response to a speaker's statement (see, for example, Patent Literature 1). Also known is a technique for analyzing changes in a subject's facial expressions over a long period of time and estimating the emotions held during that time (see, for example, Patent Literature 2). Furthermore, a technique for identifying the factors that most affected the change in emotion is also known (see, for example, Patent Literature 3-5). Furthermore, a known technique compares the subject's normal facial expression with his/her current facial expression and alerts when the subject's facial expression is dark (see, for example, Patent Literature 6). Also known is a technology that compares the subject's normal (expressionless) facial expression with the subject's current facial expression to determine the degree of the subject's emotion (see, for example, Patent Literature 7-9). Furthermore, also known are techniques for analyzing the emotions of an organization and the atmosphere in a group that an individual feels (see, for example, Patent Literature 10 and 11).

PRIOR ART LIST

Patent Literature

[Patent Literature 1] JP2019058625A
[Patent Literature 2] JP2016149063A
[Patent Literature 3] JP2020086559A
[Patent Literature 4] JP2000076421A
[Patent Literature 5] JP2017201499A
[Patent Literature 6] JP2018112831A
[Patent Literature 7] JP2011154665A
[Patent Literature 8] JP2012008949A
[Patent Literature 9] JP2013000300A
[Patent Literature 10] JP2011186521A
[Patent Literature 11] WO15/174426A1

SUMMARY OF THE INVENTION

Technical Problem

All the above-mentioned technologies are only sub-functions in a situation where communication in real space is the main focus. In other words, they were not born in a case where online communication for business, classes, etc., is the primary means of communication in response to the recent DX (Digital Transformation) of business operations, global outbreaks of infectious diseases, etc.

The purpose of this invention is to objectively evaluate these communications to make them more efficient in situations where online communication is the primary means of communication, such as meetings, lectures, or the like.

Technical Solution

According to the invention,
there is provided a video image analysis system, wherein the system operates in an environment where an online session is conducted with multiple participants and analyzes the reactions of the participants based on video images obtained by capturing the participants during the online session, regardless of whether or not the participants are displayed on a screen during the online session, comprising:
a video image acquisition unit for acquiring video images obtained by filming the participant during the online session;
an analysis unit for analyzing changes in biological responses of the participant based on the video images acquired by the video image acquisition unit;
a target reading unit that reads target information regarding the analysis result; and
an evaluation unit that compares and evaluates the read target information and the participant's analysis result.

Advantageous Effects

According to this disclosure, analyzing and evaluating video images of a video session allows for objective evaluation, especially regarding content.

In particular, the invention allows for objective evaluation of the communication exchanged for more efficient communication in situations where online communication is the primary means of communication.

DETAILED DESCRIPTION OF THE EMBODIMENTS

Figure 1:
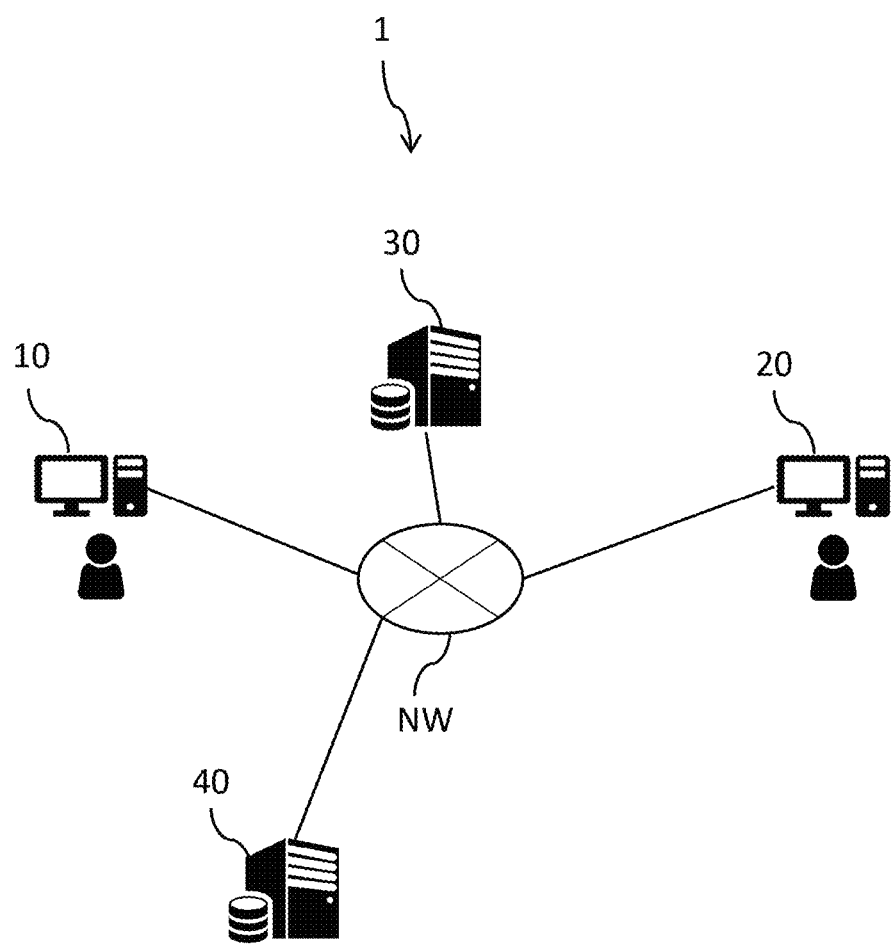
FIG. 1 shows an overall system diagram according to an embodiment of this invention.
Figure 2:
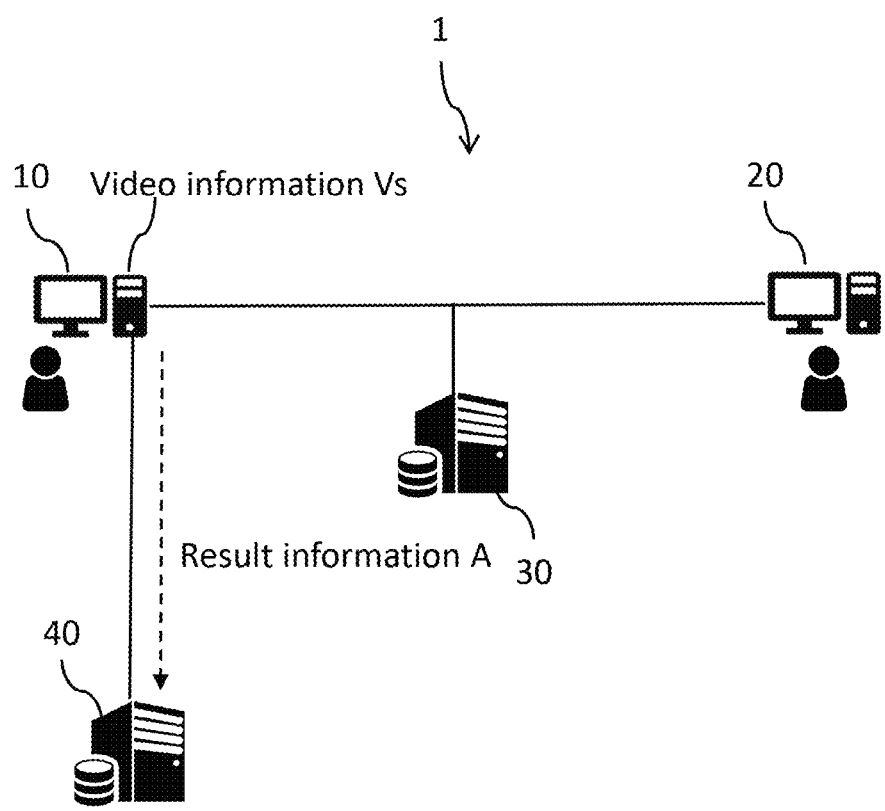
FIG. 2 shows an example of a functional block diagram of an evaluation terminal according to an embodiment of this invention.

The following is a list and description of the contents of an embodiment of this disclosure. This disclosure is comprised of the following.

[Item 1]

A video image analysis system, wherein the system operates in an environment where an online session is conducted with multiple participants and analyzes the reactions of the participants based on video images obtained by capturing the participants during the online session, regardless of whether or not the participants are displayed on a screen during the online session, comprising:
- a video image acquisition unit for acquiring video images obtained by filming the participant during the online session;
- an analysis unit for analyzing changes in biological responses of the participant based on the video images acquired by the video image acquisition unit;
- a target reading unit that reads target information regarding the analysis result; and
- an evaluation unit that compares and evaluates the read target information and the participant's analysis result.

[Item 2]

The video analysis system according to item 1, wherein the target information is a target value of change in the biological response set in a time series, wherein the evaluation unit evaluates whether or not the change in the biological response of the participant satisfies the target value.

[Item 3]

The video analysis system according to item 2, further comprising:
- a notification unit that notifies an expert terminal when, as a result of the evaluation, the trend of the participant's biological response over a predetermined period deviates from the target value by a predetermined threshold value or more.

[Item 4]

The video analysis system as in any one of items 1 to 3, further comprising:
- an evaluation provision unit that provides the results of the evaluation to the participants.

[Item 5]

A video image analysis device, comprising the video analysis system configuration as in any one of items 1 to 4.

[Item 6]

A video image analysis program, comprising the video analysis system configuration as in any one of items 1 to 4.

[Item 7]

A video image analysis method comprising the configuration of the video analysis system as in any one of items 1 to 4 as its steps.

The following is a detailed description of a preferred embodiment of this disclosure with reference to the accompanying drawings. In this specification and the drawings, duplicate explanations are omitted by attaching the same symbols to components that comprise substantially the same functional configuration.

<Basic Functions>

In this embodiment, the video session evaluation system evaluates the specific feelings (feelings toward one's own or others' words or actions: pleasantness, unpleasantness, or its degree, etc.) of the subject of analysis among multiple persons in an environment where video sessions (hereinafter referred to as online sessions including one-way and two-way sessions) are conducted by multiple persons. (feelings that occur in response to the words and actions of oneself or others: pleasantness, unpleasantness, or the degree thereof, etc.). Online sessions, such as online conferences, online classes, and online chats, connect terminals located in multiple locations to a server through a communication network such as the Internet, and allow video images to be exchanged between multiple terminals through the server. The video images handled in an online session include the facial images and sounds of the users using the terminals. The video image also includes images such as documents that are shared and viewed by multiple users. It is possible to switch between face images and document images on the screen of each terminal to display only one of them or to display face images and document images simultaneously in separate display areas. It is also possible to display the image of one of several users on a full screen or to split the image of some or all of the users into smaller screens. It is possible to designate any one or more of the multiple users participating in an online session using the terminal as the target of analysis. For example, the online session's leader, facilitator, or administrator (hereinafter collectively referred to as the "organizer") can designate any of the users as the analysis target. The organizer of the online session can be, for example, an instructor of an online class, a chairperson or facilitator of an online meeting, or a coach of a session for coaching purposes. The organizer of the online session is usually one of several users participating in the online session, but it may be another person who does not participate in the online session. All participants may be included in the analysis without specifying the person to be analyzed. It is also possible for the leader, facilitator, or administrator of the online session (hereinafter collectively referred to as the "organizer") to designate any user as an analysis target. The organizer of the online session may be, for example, an instructor of an online class, a chairperson or facilitator of an online meeting, or a coach of a session for coaching purposes. The organizer of the online session is usually one of several users participating in the online session but may be another person who does not participate in the online session.

This embodiment's video session evaluation system displays at least a video image obtained from a video session when a video session is established between a plurality of terminals. The terminals acquire the displayed video image, and at least a face image included in the video image is identified for each predetermined frame unit. Thereafter, an evaluation value is calculated for the identified face images. The evaluation values are shared as necessary. In particular, in this embodiment, the acquired video images are stored in the terminal involved, analyzed, and evaluated on the terminal. The results are provided to the user of the terminal involved. Thus, for example, even a video session containing personal or confidential information can be analyzed and evaluated without providing the video to an external evaluation organization, etc. If necessary, the results can be visualized or cross-analyzed by providing only the evaluation results (evaluation values) to an external terminal.

As shown in FIG. 1, this embodiment of a video session evaluation system comprises user terminals 10, 20, which include an input unit such as at least a camera part and a microphone part or the like, a display unit such as a display; and an output unit such as a speaker unit; a video session service terminal 30 that provides interactive video sessions to the user terminals 10 and 20; and an evaluation terminal 40 that performs part of the evaluation related to the video session.

<Hardware Configuration Example>

Each functional block, unit, and module described below can be comprised of hardware, DSP (Digital Signal Processor), or software in a computer. For example, when configured by software, the system actually comprises a computer CPU, RAM, ROM, etc., and is realized by the operation of a program stored in a recording medium such as RAM, ROM, hard disk, or semiconductor memory. The series of processes by the system and terminals described herein may be realized using software, hardware, or a combination of software and hardware. It is possible to create a computer program to realize each function of the information sharing support device 10 in this embodiment and implement it on a PC or other device. It is also possible to provide a computer-readable recording medium storing such a computer program. For example, the recording medium can be a magnetic disk, optical disk, magneto-optical disk, flash memory, etc. For example, the computer program described above may also be delivered over a network without a recording medium.

The evaluation terminal in this embodiment acquires a video image from a video session service terminal, identifies at least a face image contained in the video image for each predetermined frame unit, and calculates the evaluation value related to the face image (see below for details).

<Method of Obtaining a Video Image>

Figure 3:
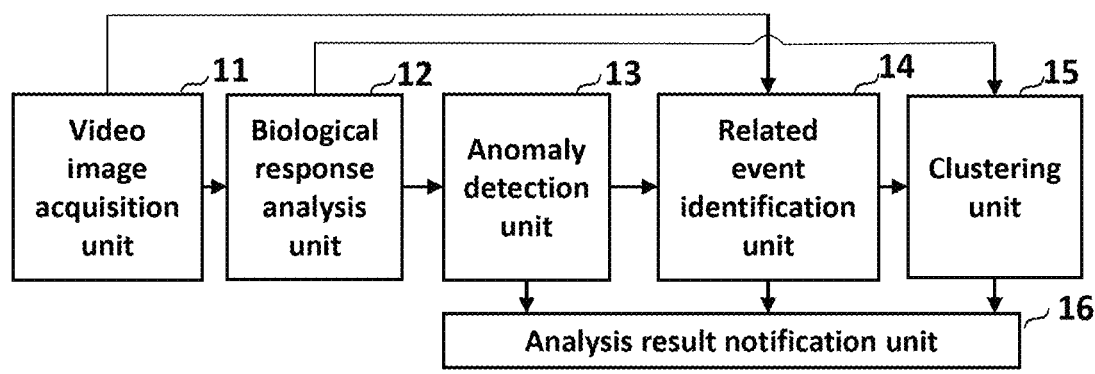
FIG. 3 shows an example of a functional configuration 1 of an evaluation terminal according to an embodiment of this embodiment.

As shown in FIG. 3, the video session service provided by the video session service terminal (hereinafter simply referred to as "the service") enables bidirectional image and audio communication to user terminals 10 and 20. The service enables the display of video images acquired by the other user terminal's camera part on the user terminal's display and the output of audio acquired by the microphone part of the other user terminal through a speaker. The service also comprises the ability for both or either user terminals to record (recording) video images and audio (together referred to as "video images, etc.") to a memory unit on at least one of the user terminals. The recorded video information Vs (hereinafter referred to as "Recorded Information") is cached on the user terminal that initiated the recording and is recorded only locally on one of the user terminals. If necessary, the user can watch the recorded information by him/herself or share it with others within the scope of use of this service.

<Functional Configuration Example 1>

Figure 4:
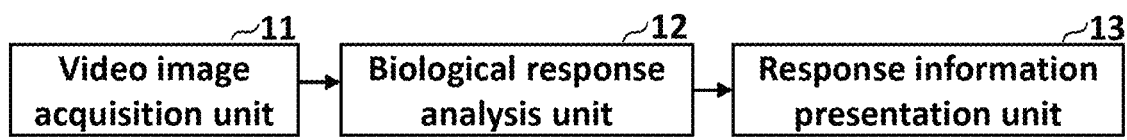
FIG. 4 shows an example of a functional configuration 2 of an evaluation terminal according to an embodiment of this embodiment.

FIG. 4 is a block diagram showing an example configuration according to this embodiment. As shown in FIG. 4, this video session evaluation system embodiment is realized as a functional configuration of the user terminal 10. That is, the user terminal 10 has as its functions a video image acquisition unit (11), a biological response analysis unit (12), an anomaly detection unit (13), a related event identification unit (14), a clustering unit (15), and an analysis result notification unit (16).

The video image acquisition unit 11 acquires video images from each terminal, which are obtained by capturing multiple people (multiple users) during an online session with a camera provided by each terminal. The video images acquired from each terminal may or may not be set to be displayed on the screen of each terminal. In other words, the video image acquisition unit 11 acquires video images from each terminal, including video images that are being displayed on the terminal and video images that are not being displayed on the terminal.

The biological response analysis unit 12 analyzes changes in biological responses for each of the plurality of persons based on the moving images (whether or not they are being displayed on the screen) acquired by the video image acquisition unit 11. In this embodiment, the biological response analysis unit 12 separates the video image acquired by the video image acquisition unit 11 into a set of images (a collection of frame images) and audio and analyzes changes in biological responses from each.

For example, the biological response analysis unit 12 analyzes changes in biological responses related to at least one of the user's facial expressions, line of sight, pulse, and facial movements by analyzing the user's face image using frame images separated from the video image acquired by the video image acquisition unit 11. The biological response analysis unit 12 also analyzes changes in biological responses related to at least one of the user's speech content and voice quality by analyzing audio separated from the video image acquired by the video image acquisition unit 11.

When a person's emotions change, it appears as a change in his/her biological reactions, such as facial expression, line of sight, pulse, facial movement, content of speech, and voice quality. In this embodiment, changes in the user's emotions are analyzed by analyzing changes in the user's biological responses. The emotion to be analyzed in this embodiment is, as an example, the degree of pleasure/displeasure. In this embodiment, the biological response analysis unit 12 calculates a biological response index value that reflects the content of the change in the biological response by quantifying the change in the biological response according to a predetermined standard.

Analysis of changes in facial expressions is performed, for example, as follows. For each frame image, a facial region is identified in the image, and the identified facial expressions are classified into multiple categories according to an image analysis model that has been machine-learned in advance. Then, based on the classification results, the system analyzes whether positive or negative facial expression changes are occurring between consecutive frame images, and the magnitude of the facial expression changes and outputs the facial expression change index value according to the analysis results.

The analysis of change in a line of sight is performed, for example, as follows. For each frame image, the system analyzes where the user is looking by identifying the eye region in the frame image and analyzing the direction of both eyes. For example, whether the user is looking at the speaker's face on the display, the shared material on the display, or outside the screen is analyzed. It may also analyze whether the line of sight's movement is large or small, and whether the movement is frequent or infrequent. Changes in the line of sight are also related to the user's level of concentration. The biological response analysis unit 12 outputs an index value of the change in a line of sight according to the analysis results of the change in a line of sight.

The analysis of pulse changes is performed, for example, as follows. That is, for each frame image, a face region is identified in the frame image. Then, using a learned image analysis model that captures the numerical value of the color information (G of RGB) of the face, the change in G color of the face surface is analyzed. By arranging the results along the time axis, a waveform representing the change in color information is formed, and the pulse rate is identified from this waveform. When a person is nervous, the pulse rate becomes faster, and when he or she feels calm, the pulse rate becomes slower. The biological response analysis unit 12 outputs a pulse rate change index value according to the pulse rate change analysis results.

Analysis of changes in facial motion is performed, for example, as follows. That is, for each frame image, the area of the face is identified in the frame image, and the direction of the face is analyzed to determine where the user is looking. For example, whether the user is looking at the speaker's face on the display, the shared material on the display or outside the screen is analyzed. It may also analyze whether the facial movements are large or small and whether the movements are frequent or infrequent. The facial movements and line of sight movements may be analyzed together. For example, it may analyze whether the user is looking straight at the speaker's face in the display, whether the user is looking upward or downward, whether the user is looking at the speaker's face from an angle, and so on. The biological response analysis unit 12 outputs a face orientation change index value according to the face orientation change analysis results.

The speech content analysis is performed, for example, as follows. The biological response analysis unit 12 converts the speech into a character string by performing a known speech recognition process on the speech for a specified period of time (e.g., 30 to 150 seconds) and then morphologically analyzes the character string to remove particles, articles, and other words that are unnecessary to express conversation. The remaining words are then converted into a vector, analyzed to determine whether a positive or negative emotional change is occurring, and the magnitude of the emotional change and an index value for the speech content is output according to the analysis results.

Analysis of voice quality is performed, for example, as follows. That is, the biological response analysis unit 12 identifies the acoustic features of the voice by performing a known voice analysis process on the voice for a specified time (e.g., 30 to 150 seconds). Then, based on the acoustic features, it analyzes whether positive or negative voice quality change is occurring and the magnitude of the voice quality change and it outputs voice quality change index values according to the analysis results.

The biological response analysis unit 12 calculates the biological response index value using at least one of the expression change index value, line-of-sight change index value, pulse rate change index value, face direction change index value, speech content index value, and voice quality change index value calculated as described above. For example, the biological response index value is calculated by weighting the expression change index value, line-of-sight change index value, pulse rate change index value, face direction change index value, speech content index value, and voice quality change index value.

The anomaly detection unit 13 determines whether the change in biological responses analyzed for the analysis subject is anomalous compared to the changes in biological responses analyzed for other persons other than the analysis subject. In this embodiment, the anomaly detection unit 13 determines whether or not the change in biological responses analyzed for the analysis subject is anomalous compared to others, based on the biological response index values calculated by the biological response analysis unit 12 for each of multiple users.

For example, the anomaly detection unit 13 calculates the variance of the biological response index values calculated for each of multiple persons by the biological response analysis unit 12, and determines whether the biological response changes analyzed for the analysis subject are anomalous compared to others by contrasting the variance with the biological response index values calculated for the analysis subject.

There are three possible cases in which the biological response changes analyzed for the subject are more unique than those for others. The first is a case in which a relatively large change in biological response occurred for the subject of the analysis, while no particularly large change in biological response occurred for others. The second is a case in which no particularly large biological response change occurs in the subject of the analysis, but a relatively large biological response change occurs in the other person. The third is a case in which a relatively large change in biological response has occurred for both the subject and others, but the content of the change differs between the subject and others.

The related event identification unit 14 identifies an event occurring with respect to at least one of the analysis subject, another person, and the environment when a change in biological response determined to be anomalous by the anomaly detection unit 13 occurs. For example, the related event identification unit 14 identifies the subject's own words and actions from the video image when an anomalous biological response change occurs for the subject. The related event identification unit 14 also identifies, from the video image, the words and actions of others when an anomalous biological response change occurs with respect to the analysis subject. The related event identification unit 14 also identifies from the video image the environment in which the anomalous biological response of the analysis subject occurred. The environment can be, for example, a shared document displayed on a screen or an object in the background of the analysis subject.

The clustering unit 15 analyzes the degree of correlation between a change in biological reaction (e.g., a combination of one or more of line of sight, pulse, facial movement, speech content, or voice quality) determined to be anomalous by the anomaly detection unit 13 and an event occurring when the anomalous biological reaction occurred (an event identified by the related event identification unit 14). If the correlation is determined to be above a certain level, the analyte or event is clustered based on the results of the correlation analysis.

For example, if the change in the anomalous biological response corresponds to a negative emotional change, and the event occurring at the time of the change in the anomalous biological response is also a negative event, a correlation above a certain level is detected. The clustering unit 15 clusters the analysis subject or event into one of several pre-segmented categories according to the content of the event, the degree of negativity, and the size of the correlation.

Similarly, if the change in the anomalous biological response corresponds to a positive emotional change and the event occurring at the time of the change in the anomalous biological response is also a positive event, a correlation above a certain level is detected. The clustering unit 15 clusters the analysis subject or event into one of several pre-segmented categories according to the content of the event, the degree of positivity, and the size of the correlation.

The analysis result notification unit 16 notifies the person designated by the analysis subject (the analysis subject or the online session organizer) of at least one of the changes in biological responses determined to be anomalous by the anomaly detection unit 13, the events identified by the related event identification unit 14, and the classification clustered by the clustering unit 15.

For example, the analysis result notification unit 16 notifies the subject of the analysis of his or her own words and actions as events that occur when a change in anomalous biological reactions different from those of others occurs (any of the three patterns described above; the same applies below). This allows the analysis subject to understand that he/she has different feelings from others when he/she says or does certain things. At this time, the change in anomalous biological responses identified for the analysis subject may also be notified to the analysis subject. Furthermore, the change in the biological response of the other person being contrasted may be further notified to the analysis subject.

For example, if there is a discrepancy between the feelings received by others in response to words or actions that the subject of analysis has said or done without being particularly conscious of them, or words or actions that the subject of analysis has said or done with a certain feeling and being particularly conscious of them, and the feelings the subject of analysis was having at the time of the words or actions, the subject of analysis's own words or actions at that time are notified to the subject of analysis. The subject of the analysis is notified. This makes it possible to discover words and actions that are well-received by others and words and actions that are not well-received by others, contrary to one's own awareness.

In addition, the analysis result notification unit 16 notifies the online session organizer of the events that are occurring when an anomalous biological reaction change that is different from others occurs for the analysis target person, along with the anomalous biological reaction change. This allows the organizer of the online session to know what events are affecting what kind of emotional change as a phenomenon specific to the designated analysis target person. Then, appropriate measures can be taken for the analysis subject according to the information obtained.

In addition, the analysis result notification unit 16 notifies the online session organizer of the event or the clustering result of the analysis subject when an anomalous biological response change that is different from others occurs for the analysis subject. This allows the online session organizer to understand the tendency of behavior specific to the analysis subject and to predict possible future behaviors and conditions, etc., depending on the classification into which the specified analysis subject was clustered. Then, appropriate measures can be taken for the analysis subject.

In the above embodiment, a biological response index value is calculated by quantifying changes in biological responses according to predetermined criteria, and whether or not changes in biological responses analyzed for a subject are more or less anomalous than those of others is determined based on the biological response index values calculated for each of a plurality of persons. However, this example is not limited to this example. For example, the following may be used.

That is, the biological response analysis unit 12 analyzes the line-of-sight movement for each of the multiple persons and generates a heat map showing the direction of the line-of-sight. The anomaly detection unit 13 determines whether the change in the biological response analyzed for the subject is more or less anomalous than the change in the biological response analyzed for others by comparing the heat map generated for the subject by the biological response analysis unit 12 with the heat maps generated for the others.

Thus, in this embodiment, the video images of the video session are stored in the local storage of the user terminal 10, and the analysis described above is performed on the user terminal 10. Even though it may depend on the machine specifications of the user terminal 10, it is possible to analyze the video images without providing the information of the video images to external parties.

<Functional Configuration Example 2>

Figure 5:
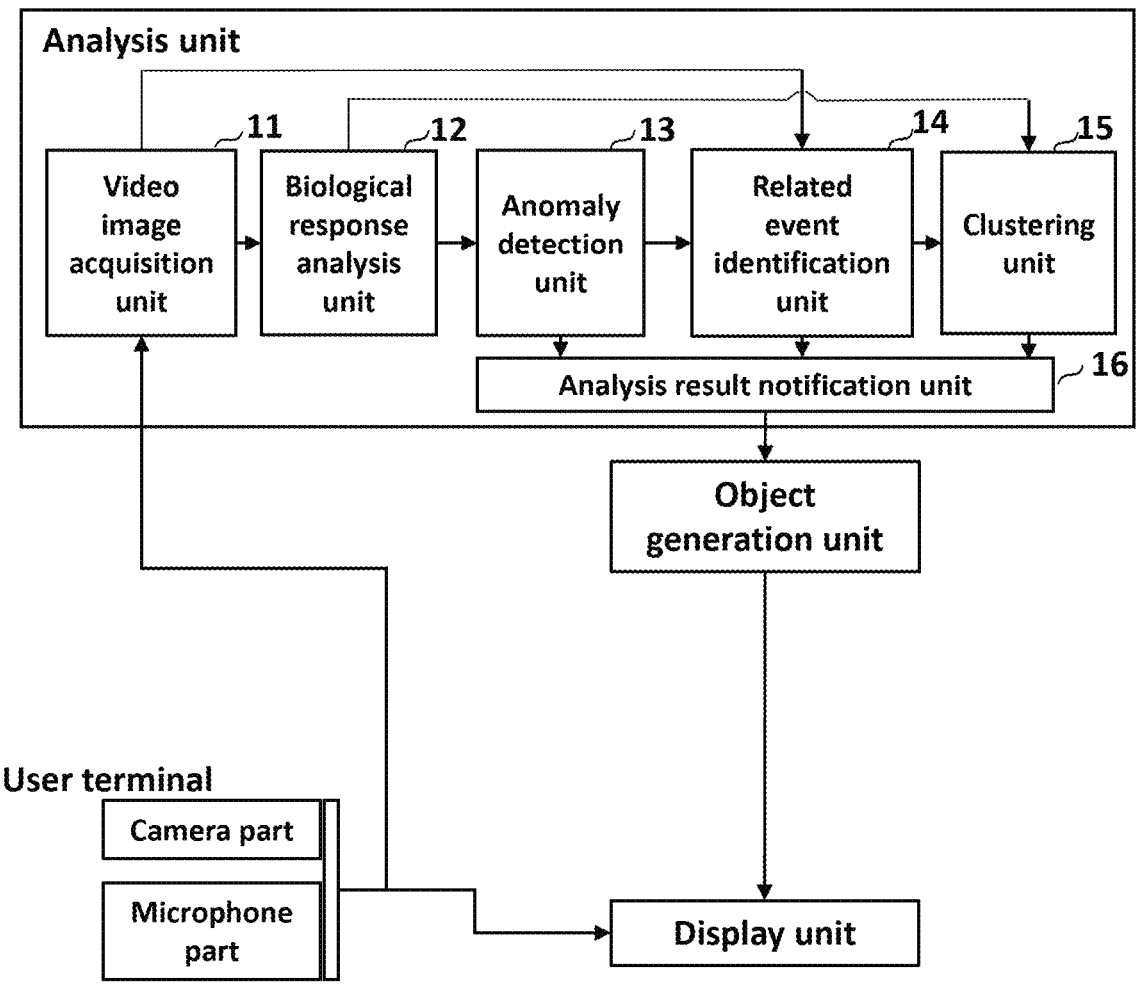
FIG. 5 shows an example of a functional configuration 3 of an evaluation terminal according to an embodiment of this invention.

As shown in FIG. 5, this embodiment of the video session evaluation system may be equipped with a video image acquisition unit 11, a biological response analysis unit 12, and a response information presentation unit 13*a* as a functional configuration.

The response information presentation unit 13*a* presents information indicating changes in biological responses analyzed by the biological response analysis unit 12*a*, including participants who are not displayed on the screen. For example, the response information presentation unit 13*a* presents information indicating changes in biological responses to the leader, facilitator, or administrator of the online session (hereinafter collectively referred to as the "organizer"). The organizer of an online session is, for example, an instructor of an online class, a chairperson or facilitator of an online meeting, or a coach of a session for coaching purposes. The organizer of an online session is usually one of several users participating in the online session, but maybe another person who does not participate in the online session.

In this way, the online session organizer can keep track of participants who are not displayed on the screen in a multi-person online session environment.

<Functional Configuration Example 3>

Figure 6:
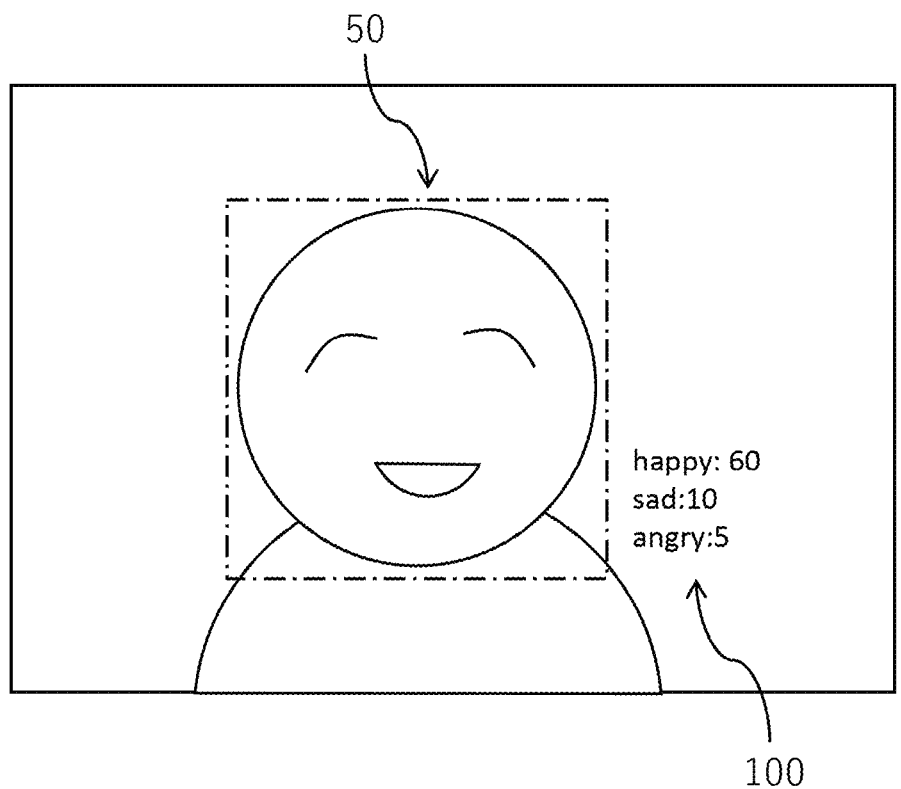
FIG. 6 shows an example of a screen display according to the functional configuration example 3 in FIG. 6.

FIG. 6 is a block diagram showing an example configuration according to this embodiment. As shown in FIG. 6, this embodiment of the video session evaluation system comprises, as a functional configuration, functions similar to those in embodiment 1 above, which may be omitted from the explanation with the same reference numerals.

This embodiment of the system comprises a camera part to acquire video images of the video session and a microphone part to acquire audio, an analysis unit to analyze and evaluate the video images, an object generation unit to generate display objects (described below) based on the information obtained by evaluating the acquired video images, and a display unit to display both the video image of the video session and the display object during execution of the video session.

As described above, the analysis unit has a video image acquisition unit 11, a biological response analysis unit 12, an anomaly detection unit 13, a related event identification unit 14, a clustering unit 15, and an analysis result notification unit 16. The function of each element is as described above.

Figure 7:
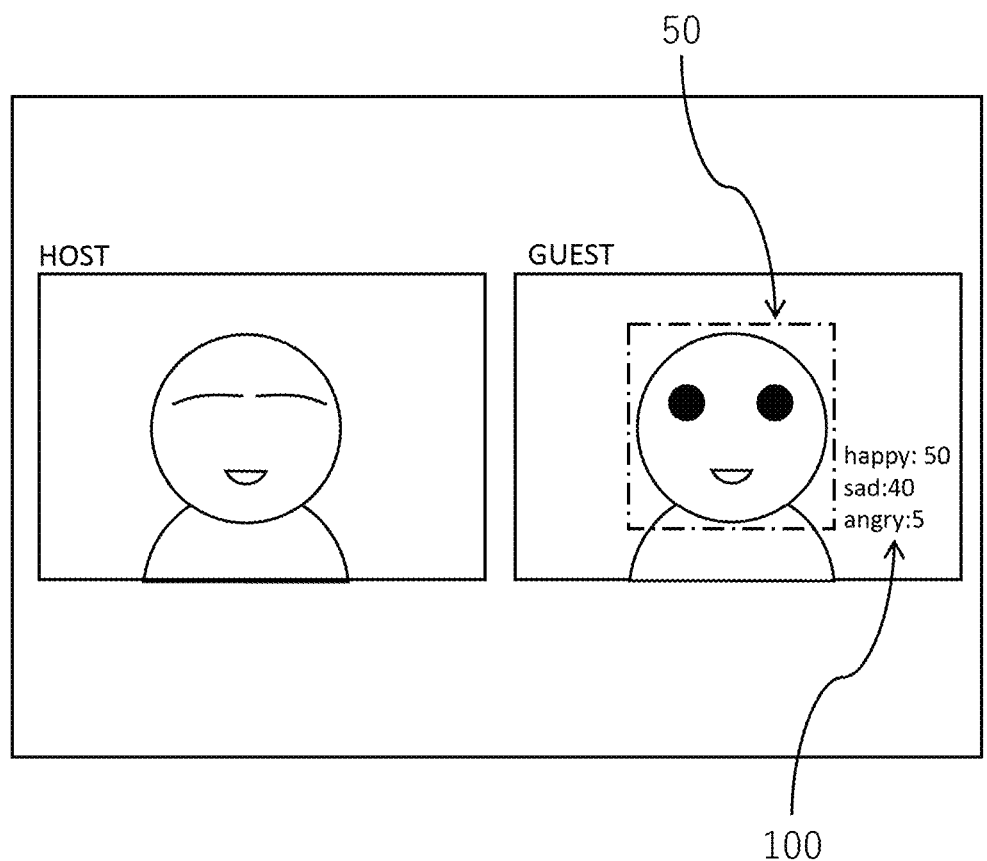
FIG. 7 shows another example of a screen display according to the functional configuration example 3 of FIG. 6.

As shown in FIG. 7, based on the results of the analysis of the video image acquired from the video session by the analysis unit, the object generation unit superimposes and displays on the video image, if necessary, an object 50 indicating the recognized part of the face and information 100 indicating the above-mentioned analyzed and evaluated content. The object 50 may be used to identify and display the faces of all of the multiple persons when multiple faces are moved in the video image.

For example, even if the camera function of the video session is stopped at the other terminal (i.e., not by physically covering the camera, etc., but by software within the video session application), the object 50 may be displayed in the area where the other party's face is located if the other party's camera recognizes the other party's face. This allows both parties to confirm that the other party is in front of the terminal even if the camera function is turned off. In this case, for example, the information acquired from the camera may be hidden in the video session application, while only the object 50 or object 100 corresponding to the face recognized by the analysis unit may be displayed. It is also possible to divide the video information acquired from the video session and the information recognized and obtained by the analysis unit into different display layers, and to hide the layer related to the former information.

Figure 8:
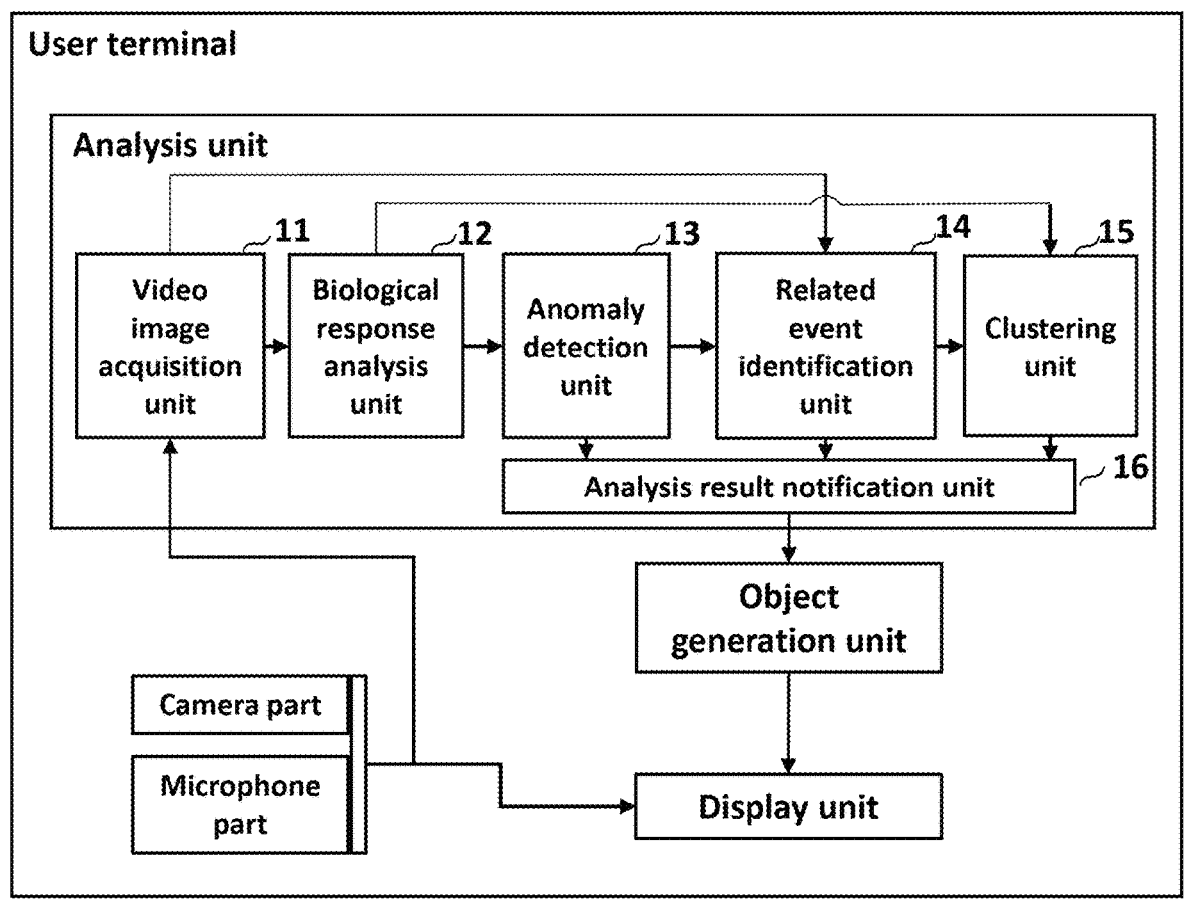
FIG. 8 shows another example of the functional configuration example 3 of the evaluation terminal according to an embodiment of this invention.

Object 50 and object 100 may be displayed in all or only some of the areas where multiple video images are displayed. For example, as shown in FIG. 8, they may be displayed only in the guest-side video image.

The embodiments of the invention described in Basic Configuration Examples 1 through 3 above may be realized as a single device or by multiple devices (e.g., cloud servers) connected in part or in whole via a network. For example, the control unit 110 and storage 130 of each terminal 10 may be realized by different servers connected by a network to each other. That is, where the system includes user terminals 10 and 20, a video session service terminal 30 that provides interactive video sessions to user terminals 10 and 20, and an evaluation terminal 40 that evaluates the video sessions, the following various combinations of configurations are possible.

Figure 9:
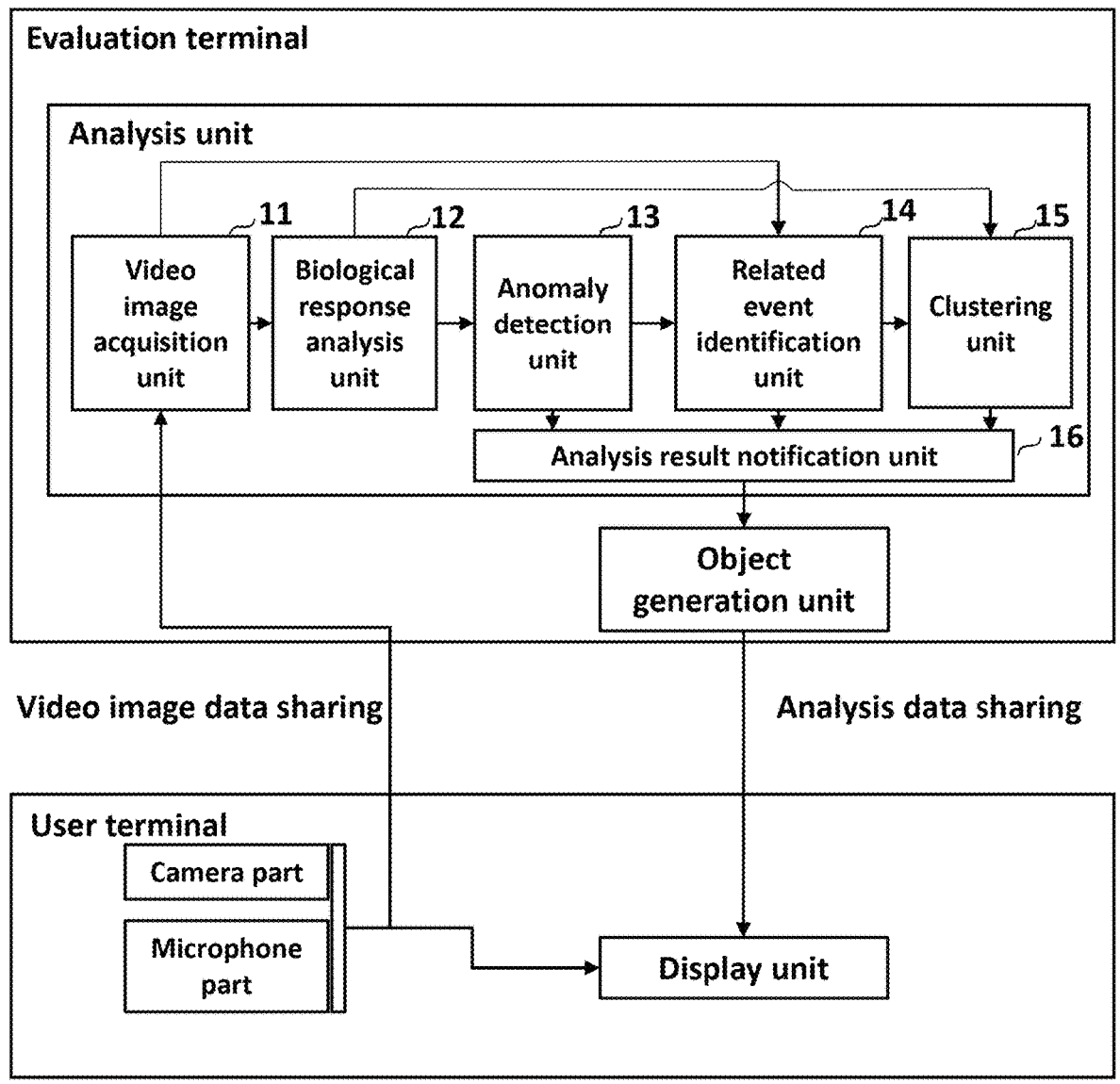
FIG. 9 shows another configuration example 3 of the functional configuration of the evaluation terminal according to an embodiment of this invention.

(1) Everything is Handled by the User Terminal Only:

As shown in FIG. 9, processing by the analysis unit is performed at the terminal where the video session is being conducted, so that analysis and evaluation results can be obtained simultaneously (in real time) with the time of the video session (although a certain processing capacity is required).

Figure 10:
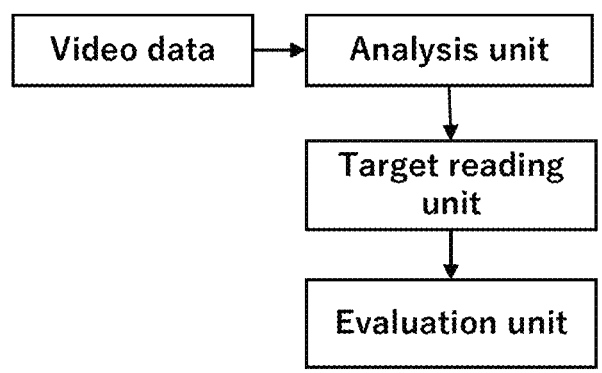
FIG. 10 shows a functional block diagram of the system according to an embodiment of this invention.

(2) Processing at Both the User and Evaluation Terminals:

As shown in FIG. 10, an evaluation terminal connected by a network or other means can be equipped with an analysis unit. In this case, the video acquired at the user terminal is shared to the evaluation terminal at the same time as the video session or after the fact, and after being analyzed and evaluated by the analysis unit at the evaluation terminal, information on objects 50 and 100 is shared with the user terminal together with or separately from the video data, i.e., the information including at least the analysis data, and is displayed on the display unit.

The following system is realized using each of the above-mentioned functional configuration examples 1 through 3, or a combination thereof.

EMBODIMENT

In this embodiment, a video image analysis system (hereinafter simply referred to as "the system") analyzes and assesses the responses of participants based on video images obtained by filming all or only specific participants in an environment where an online session is conducted with multiple participants. The analysis may be performed regardless of whether or not the participants are visible on the screen during the online session.

One use of this embodiment of the system is to automatically trace the measurement of the effectiveness of the treatment through online sessions for participants whose mental health has been compromised, for example, due to exposure to emerging stress. Conversely, the system could also be used to check whether they are growing toward their idealized emotional expression goals so they can become the person they want to be.

As shown in FIG. 10, this embodiment of the system has a video image acquisition unit that acquires video image data; an analysis unit; a target reading unit; and an evaluation unit. The video image acquisition unit acquires video images obtained by filming participants during an online session. The analysis unit analyzes changes in biological responses for the participant based on the video images acquired by the video image acquisition unit (see also FIGS. 3 through 5, etc.).

The target reading unit reads target information regarding the analysis results. The target information is the target value of the change in the participant's biological response set in a time series. The target value may be a time series of analysis values (e.g., the solid line graph in FIG. 11) according to a predetermined perspective (analysis values corresponding to anger, fear, expectation, surprise, joy, sadness, trust, disgust, etc.). By evaluating whether or not the participants (the target of evaluation) are changing in accordance with the set target values, it is possible to measure the effectiveness of the treatment (not shown in the figure), etc. to the participants.

Figure 11:
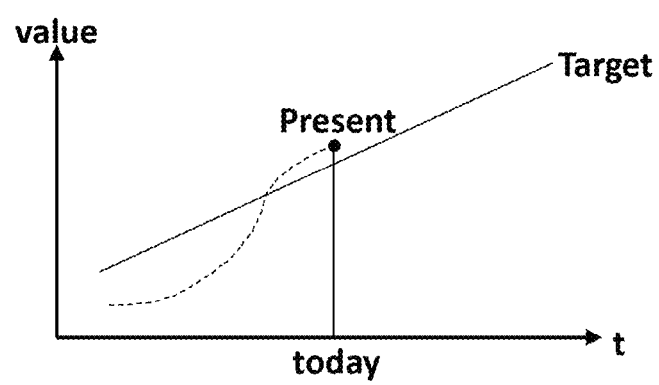
FIG. 11 shows a comparative diagram of the analysis results (emotion graph) in this embodiment.

As shown in FIG. 11, the evaluation unit provides participants with an evaluation of whether the results of the analysis by the analysis unit are in line with the target information. For example, as illustrated in the figure, the progress is visually understood by noting the history of past analysis results alongside the goals.

Figure 12:
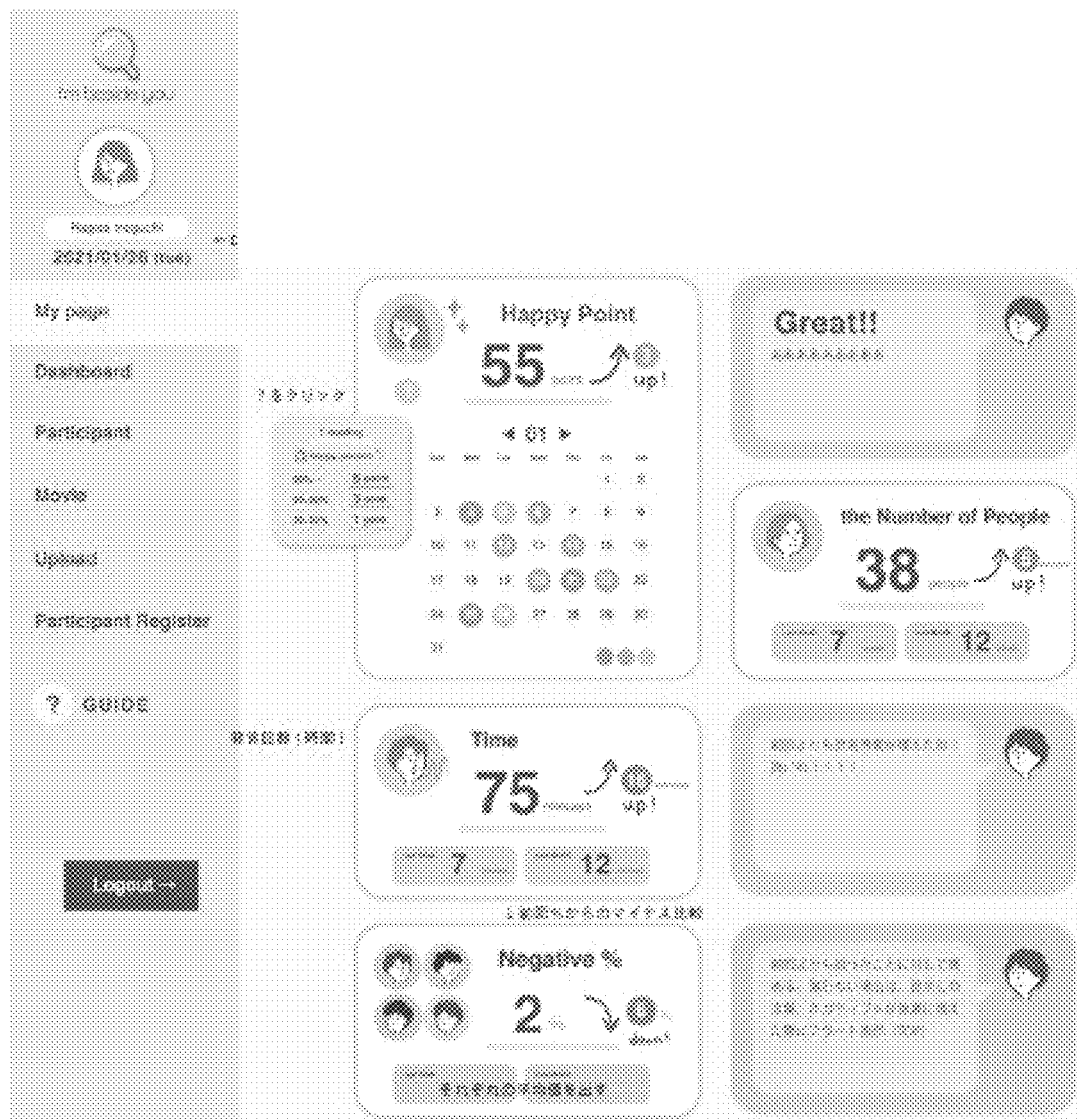
FIG. 12 shows an example of the display of the comparison results in this embodiment.

Furthermore, as shown in FIG. 12, the amount by which the negative (Negative %) expressions have decreased may be displayed along with the object image.

The system may further comprise a notification unit that notifies a medical professional's or other's expert terminal if, as a result of the evaluation, the trend of the participant's biological response over a predetermined period (see FIG. 11) deviates from the target value by a predetermined threshold value or more.

Video Image Analysis System.

The processes described herein using flowchart diagrams do not necessarily have to be performed in the order illustrated. Some processing steps may be executed in parallel. Additional processing steps may be employed, and some processing steps may be omitted.

The above-described embodiments may be combined as appropriate. In addition, the effects described herein are only illustrative or exemplary and not limiting. In other words, the technology of the present disclosure may produce other effects that are obvious to those skilled in the art from the description herein, either together with or in place of the above effects.

DESCRIPTION OF REFERENCE NUMERALS

10, 20 User terminals
30 Video session service terminal
40 Evaluation terminal

The invention claimed is:

1. A video image analysis system, wherein the system operates in an environment where an online session is conducted with multiple participants and analyzes the reactions of the participants based on video images obtained by capturing the participants during the online session, comprising:

a video image acquisition unit for acquiring video images obtained by filming the participant during the online session;

an analysis unit for analyzing changes in biological responses of the participant based on the video images acquired by the video image acquisition unit;

a target reading unit that reads target information related to the analysis result; and an evaluation unit that compares and evaluates the read target information and the participant's analysis result, and a notification unit for notifying an expert terminal when the trend of the participant's biological response over a predetermined period deviates from the target value by a predetermined threshold or more as a result of the evaluation, wherein the analysis unit determines whether a change in a biological response analyzed for the participant is more anomalous or not when compared with a change in a biological response analyzed for another participant; identifies an event occurring with respect to at least one of said participant, another participant, or the environment at the time the biological response change determined to be anomalous to the participant occurred; analyzes the degree of correlation between the change in the biological response of the participant and the event; and, when the correlation is determined to be above a certain level, clusters the participant or the event based on the result of the analysis of the correlation.

2. The video image analysis system according to claim 1, wherein the target information is a target value of the change in the biological response set in a time series; and wherein the evaluation unit evaluates whether or not the change in the biological response of the participant meets the target value.

3. The video image analysis system according to claim 1, further comprising:

an evaluation provision unit that provides the results of the evaluation to the participant.

4. The video image analysis system according to claim 1, wherein the analysis unit analyzes the eye movements for each of the plurality of participants to generate a heat map showing the direction of the eye movements; and, by comparing the heat map with a heat map of the eye movements for each of the plurality of participants determines whether the change in the biological response analyzed for the participant is more anomalous or not compared with the change in the biological response analyzed for the other participants.

* * * * *